(12) United States Patent
Hall

(10) Patent No.: US 10,612,557 B2
(45) Date of Patent: Apr. 7, 2020

(54) NOSE CONE ATTACHMENT FOR TURBOFAN ENGINE

(71) Applicant: Rolls-Royce Corporation, Indianapolis, IN (US)

(72) Inventor: Christopher Hall, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 827 days.

(21) Appl. No.: 15/211,756

(22) Filed: Jul. 15, 2016

(65) Prior Publication Data
US 2018/0017071 A1   Jan. 18, 2018

(51) Int. Cl.
| F04D 29/32 | (2006.01) |
| B64C 11/14 | (2006.01) |
| F02C 7/04  | (2006.01) |
| F02K 3/06  | (2006.01) |
| F04D 29/64 | (2006.01) |

(52) U.S. Cl.
CPC ........... *F04D 29/329* (2013.01); *B64C 11/14* (2013.01); *F02C 7/04* (2013.01); *F02K 3/06* (2013.01); *F04D 29/644* (2013.01); *F05D 2220/36* (2013.01); *F05D 2230/60* (2013.01); *F05D 2240/12* (2013.01); *F05D 2260/30* (2013.01)

(58) Field of Classification Search
CPC ........ F04D 29/329; F04D 29/644; F02C 7/04; B64C 11/14; F02K 3/06; F05D 2260/30; F05D 2240/12; F05D 2220/36; F05D 2230/60
See application file for complete search history.

(56) References Cited

U.S. PATENT DOCUMENTS

| 1,668,972 | A | * | 5/1928  | McCauley    | B64C 11/14 416/245 R |
| 1,730,742 | A | * | 10/1929 | Nelson      | B64C 11/14 416/245 R |
| 1,773,319 | A | * | 8/1930  | Rauen       | B64C 11/14 416/245 R |
| 2,297,226 | A | * | 9/1942  | Muller-Keuth| B64C 11/14 416/245 R |
| 2,534,662 | A | * | 12/1950 | Froom       | B64C 11/14 403/306 |
| 3,390,527 | A |   | 7/1968  | Decher et al. | |
| 3,990,814 | A | * | 11/1976 | Leone       | B64C 7/02 416/245 R |
| 4,546,604 | A | * | 10/1985 | Moore       | F02C 7/047 415/175 |
| 4,863,354 | A | * | 9/1989  | Asselin     | B64C 11/14 416/245 R |
| 7,303,377 | B2| * | 12/2007 | Rockarts    | F01D 5/027 416/144 |

(Continued)

OTHER PUBLICATIONS

Extended European Search Report for European Application No. EP 17176569, dated Dec. 8, 2017 (9 pages).

*Primary Examiner* — Dwayne J White
*Assistant Examiner* — Adam W Brown
(74) *Attorney, Agent, or Firm* — McCracken & Gillen LLC

(57) ABSTRACT

An assembly for attaching a nose cone to a turbofan engine includes a single center bolt connector, a nose cone, and a turbofan hub. Further, the single center bolt connector couples the nose cone to the turbofan hub and axially clamps the nose cone to the turbofan hub.

16 Claims, 4 Drawing Sheets

(56) References Cited

U.S. PATENT DOCUMENTS

| | | | |
|---|---|---|---|
| 8,092,183 B2 * | 1/2012 | Borzakian | F01D 5/027 |
| | | | 416/219 R |
| 8,678,772 B2 | 3/2014 | Dieling | |
| 10,190,607 B2 * | 1/2019 | Goldring | B64C 25/22 |
| 2010/0051112 A1 | 3/2010 | Dieling | |
| 2011/0236217 A1 | 9/2011 | Bottome et al. | |

* cited by examiner

NOSE CONE ATTACHMENT FOR TURBOFAN ENGINE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to engines, and more particularly, to attaching nose cones to turbofan engines.

BACKGROUND

Turbofan engines are frequently employed in aviation. Referring now to the prior art design shown in FIG. 1 a typical turbofan engine 30 is illustrated. The turbofan engine 30 includes a case 32 surrounding a turbofan 34 and a number of compressor stages. Fan blade(s) 36 are secured to a shaft 38 by way of a rotor disk or hub 40 during normal operation. Conventional turbofan engines employ fan blade (s) 36 that are not integral to the rotor disk 40. Instead, the fan blade(s) 36 are individually joined to the rotor disk 40 by dovetail joints. The rotor disk 40 has mounting slots arranged around an exterior surface thereof. During normal operation, the shaft 38 rotates thereby rotating the hub 40. The hub 40 in turn produces the rotation of the fan blade(s) 36 around the shaft 38.

Referring still to FIG. 1, the turbofan engine 30 takes air into the engine at the turbofan 34 stage. The turbofan engine 30 directs the air through a number of low pressure, intermediate pressure, and high-pressure compressor and turbine stages before the air is mixed with fuel, combusted, and passed through a number of turbine stages. The air eventually exits the engine 30 through an exhaust. The various stages, like the turbofan 34 are configured to rotate with the shaft 38.

Air is pulled into the engine 30 through a front opening 42 of the engine 30 and into the turbofan 34 stage. The turbofan engine 30 may use conventional fan blades 36 that attach to the rotor disk 40 at a dovetail joint, as described above. However, the turbofan engine 30 may instead use an integrally bladed rotor or bladed disk ("blisk"). Referring to FIG. 2, a blisk 48 comprising a single component is depicted. Blisks may be machined from a single piece of metal, forged or cast as one part, or welded together into a single piece. In fabricating the blisk 48, fan blades or airfoils 50 are integrally formed to a blisk hub 52.

For the conventional turbofan 34 blade platforms 46 provide a secondary surface that has aerodynamic qualities surrounding the hub 40, which otherwise would have joints, mounting slots, and blade roots 44 exposed to the airflow through the turbofan 34 stage. Likewise, for the blisk turbofan 48 design, blade platforms 46 are not included, once again because the blisk fan airfoil(s) 50 attach directly to the blisk hub 52. Therefore, an analogous aerodynamic interior surface for the blisk 48 turbofan design is provided by the outer surface 54 of the blisk hub 52.

To provide a smooth flow of air through the front opening 42 of the turbofan engine 30, and into the turbofan 34, a nose cone assembly 56 is attached to the hub 40 or blisk hub 52. The nose cone assembly 56 has a generally conical shape. The central axis of the nose cone assembly 56 is substantially aligned with the axis of the rotating shaft 38. A conical tip 58 of the nose cone assembly 56 points out and away from the front opening 42 of the turbofan engine 30.

Opposite the conical tip 58, the nose cone assembly 56 expands to form a substantially circular base 60 that meets and is secured to the hub 40 or blisk hub 52 typically by a separate mount ring. The diameter of the substantially circular base 60 of the nose cone assembly 56 may be more or less large, relative the hub 40 or blisk hub 52, depending on the particular nose cone assembly design 56 and the manner by which the substantially circular base 60 is attached to the hub 40 or blisk hub 52. It is an objective of the nose cone assembly 56 to provide an aerodynamic path for air entering the front opening 42 of the turbofan engine 30.

Referring now to FIG. 3, the conventional nose cone assembly 56 utilizes an aluminum nose cone mount ring 62. The aluminum nose cone mount ring 62 of the conventional design also serves as a forward blade retainer 74 that secures the blade root 44 within a respective mounting slot. The nose cone mount ring 62 includes a securing component 76 such as bolts, screws, or other base end fastener pieces 70 that secure the nose cone mount ring 62 to a hub flange 72. These securing components 76 operate in conjunction with fingers or tangs extending radially inward from the nose cone mount ring 62 to attach to the fan disc hub 40. The fingers or tangs and the securing components 76 operate together to attach to the nose cone assembly 56. Moreover, a portion of the mount ring 62 radially outside the hub flange 72 acts as the forward blade retainer 74. The securing component(s) 76 used to attach the nose cone mount ring 62 to the hub flange 72 frequently serve the dual purpose of customizing forward balance and/or trim balance. Although the holes or other removal of material that provides space for the securing component(s) 76 may be used to customize forward balance. Conventionally an aluminum, composite, or polymer material is used for the nose cone assembly 56 to achieve reduced weight and cost. However, mechanically bolting to a polymer or composite material may cause stresses the selected material is not be capable of withstanding.

However, the blisk turbofan, being one integral component, obviates the need for the forward blade retainer 74. The nose cone assembly 56 for the blisk 48 turbofan may be attached by either a blisk nose cone mount ring or integral blisk attachment fingers 80. Referring next to FIG. 4, a configuration of the blisk 48 turbofan for use with a blisk mount ring is shown. The conventional blisk mount ring design may be used with the blisk 48 such that the mount ring 62 provides fingers, tangs, or a simple circumferentially continuous flange for attachment to the nose cone assembly 56 in a similar manner to the nose cone assembly 56 for the conventional turbofan 34 design. Alternatively, the integral blisk style may employ the fingers 80, tangs, or a circumferentially continuous flange attachment from the blisk hub 52 itself.

In order to accommodate the nose cone assembly 56, a lower arm 64 and flange 66 of the blisk hub 52 may be extended forward to provide a surface whereon a nose cone assembly 56 would attach. In the absence of an additional mounting ring, the flange 66 may have disposed thereon the integral fingers 80 fabricated as part of the blisk hub 52 and arranged about the extended flange 66. Forward extension of the lower arm 64 and the flange 66 may introduce significant difficulty in machining a cavity 68 thereabove. In addition, such a modification would extend the forging envelope forward a significant amount. The integral fingers 80 in this conventional blisk nose cone assembly 56 also provide trim balance. Further, just as above described with respect to the mount ring 62 configuration, forward balance is manipulated at the location where the nose cone assembly 56 attaches to the fingers 80 either by modification of the securing component(s) 76 or the material extricated to accommodate same.

As a result of the integral fingers providing trim balance for the blisk 48 and the securing component(s) 76 that connect to the integral fingers 80 through the nose cone assembly 56 or spaces thereabout providing forward balance, an interdependence between trim and blisk forward balance features is developed. A precise balancing may be difficult to achieve given the space constraints on configuring both types of balancing features along substantially the same plane of the nose cone assembly 56 inner circumference. Such balancing may be particularly difficult when considering inner flow path diameters having considerably smaller diameters derived by either small turbofan size, generally, or from a fan having a small hub/tip ratio.

Extension of the forging envelope may lead to further difficulties in machining the entire blisk, thereby increasing time of manufacture, weight, and overall expense. Adaptation of the blisk 48 design depicted in FIG. 4 produces a blisk forward balance problem. Moreover, any balance feature added further forward than the extent of the blisk 48 shown in FIG. 4, such as fingers 80 extending forward therefrom, becomes relatively less capable of providing balance adjustments because of the decreased radius of such component as compared with a trim balance feature located proximal the diameter of the blisk hub 52.

A need exists for better securing nose cone assemblies to blisk turbofan engines.

SUMMARY

According to one aspect, an assembly for attaching a nose cone to a turbofan engine includes a single center bolt connector, a nose cone, and a turbofan hub. Further, the single center bolt connector couples the nose cone to the turbofan hub and axially clamps the nose cone to the turbofan hub.

According to another aspect, a method of attaching a nose cone to a turbofan engine includes coupling a first end of a center bolt connector to the nose cone, coupling a second end of the center bolt connector to a blisk, and axially clamping the nose cone to the blisk with the center bolt connector.

According to yet another aspect, a device for attaching a nose cone to a turbofan engine includes a bolt, a nose cone, and a blisk hub. The device further includes an interrupted pilot disposed about the nose cone and one or more scallops disposed about the blisk hub. The bolt, the interrupted pilot, and the one or more scallops of the device operate together to secure the nose cone to the blisk hub.

Other aspects and advantages will become apparent upon consideration of the following detailed description and the attached drawings wherein like numerals designate like structures throughout the specification.

DETAILED DESCRIPTION

Figure 1:
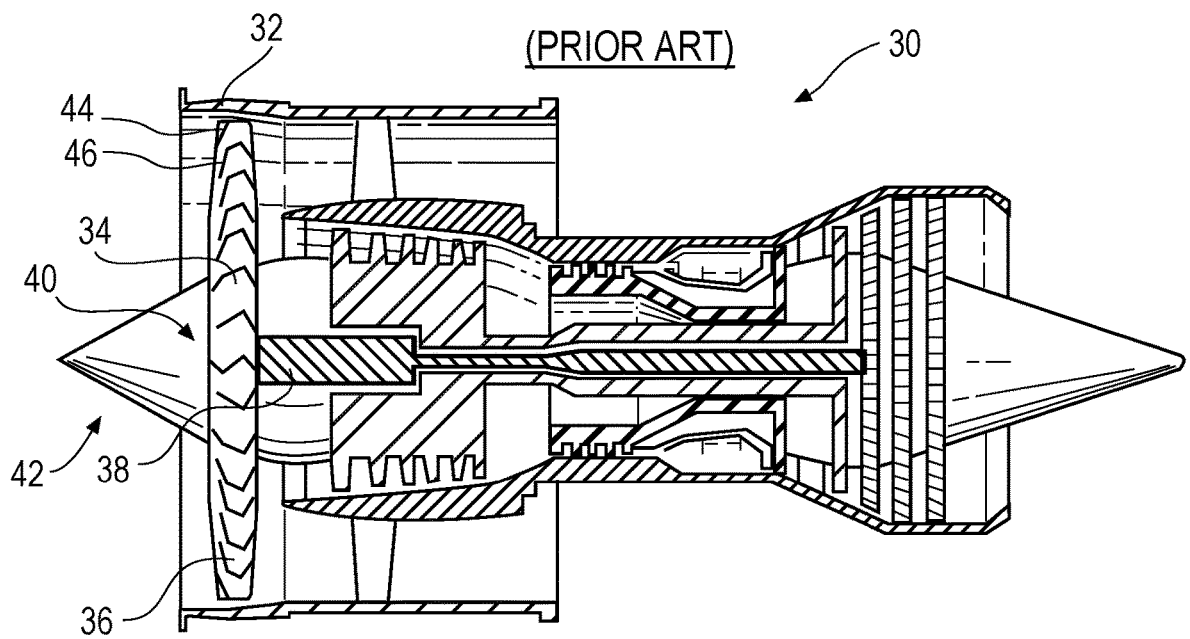
FIG. 1 shows cross-section of a turbofan engine.

As discussed hereinabove, in order to provide a smooth flow of air through the front opening 42 of the turbofan engine 30, and into the turbofan 34, a nose cone assembly 56 is attached to the blisk hub 52. The nose cone assembly 56 has a generally conical shape with a central axis thereof substantially aligned with the axis of the rotating shaft 38 that drives the turbofan 34. The conical tip 58 of the nose cone assembly 56 points out and away from the front opening 42 of the turbofan engine 30. It is an objective of the nose cone assembly 56 to be fixedly attached to the blisk hub 52 such that an aerodynamic surface is provided for entering air. It may be further desirable to reduce weight, provide effective trim and/or forward balance, and decrease relative complexity, time, and/or expense of manufacture for a nose cone assembly.

As mentioned hereinabove, the conventional turbofan 34 is an assembled component including the rotor disk 40 and a plurality of individual fan blades 36 removably inserted into respective mounting slots about the hub 40. Whereas the conventional fan 34 is assembled from a number of separate parts, the blisk 48 is integrally formed. The unique nature and manufacture of the blisk 48 may affect airflow in and about the turbofan stage 34. Likewise, the unique manufacture of the blisk 48 may present challenges in attaching a conventional nose cone assembly 56 thereto. Nose cone attachment to the blisk 48 or any disc with a relatively small front circumference may be assisted by improved packaging, incorporation of blisk and/or disc balance features, reduction of weight, and reduction of manufacturing cost and/or complexity.

Figure 3:
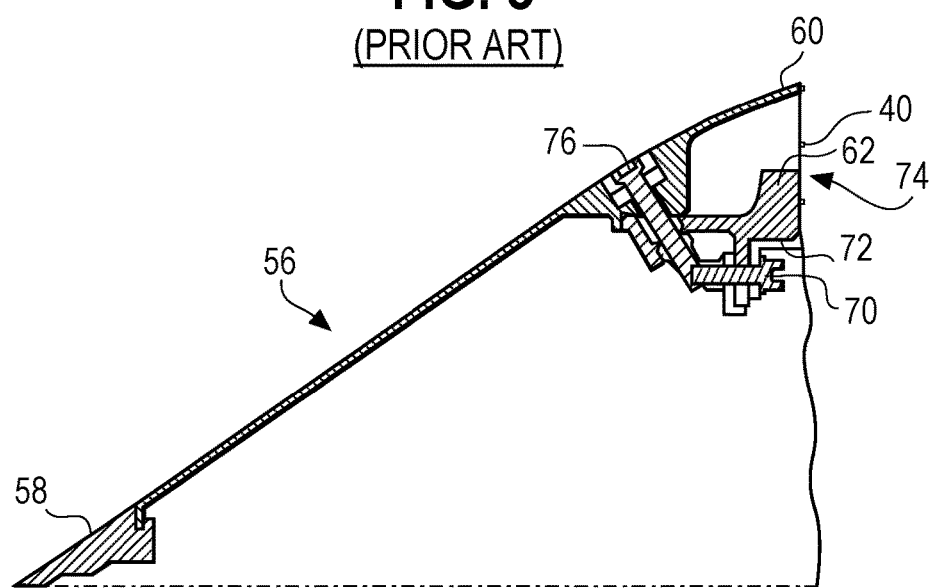
FIG. 3 shows a cross-sectional view of a portion of a conventional nose cone.
Figure 2:
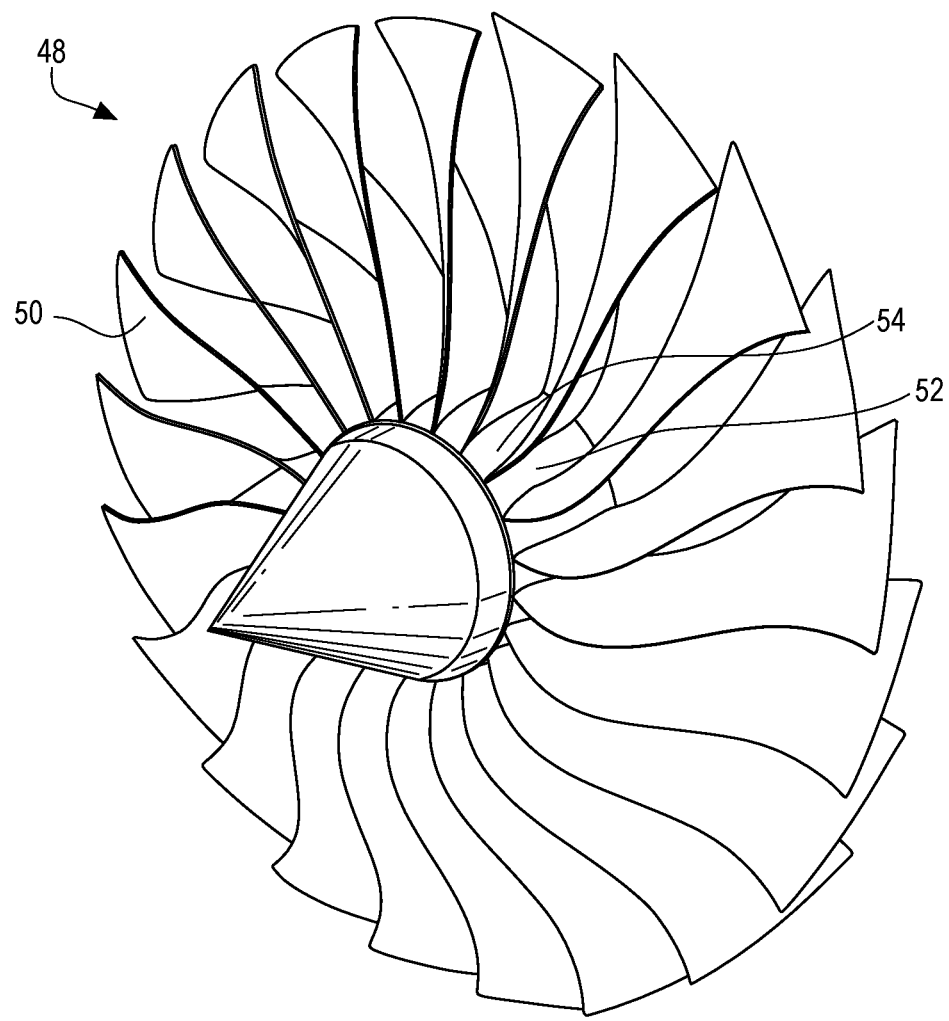
FIG. 2 shows an isometric view from the front of a blisk.
Figure 4:
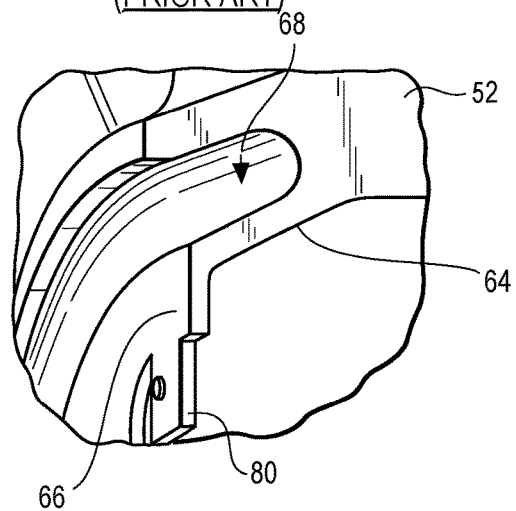
FIG. 4 shows a cross-sectional view of a portion of a conventional nose cone attachment for a blisk (bladed disk)
Figure 5:
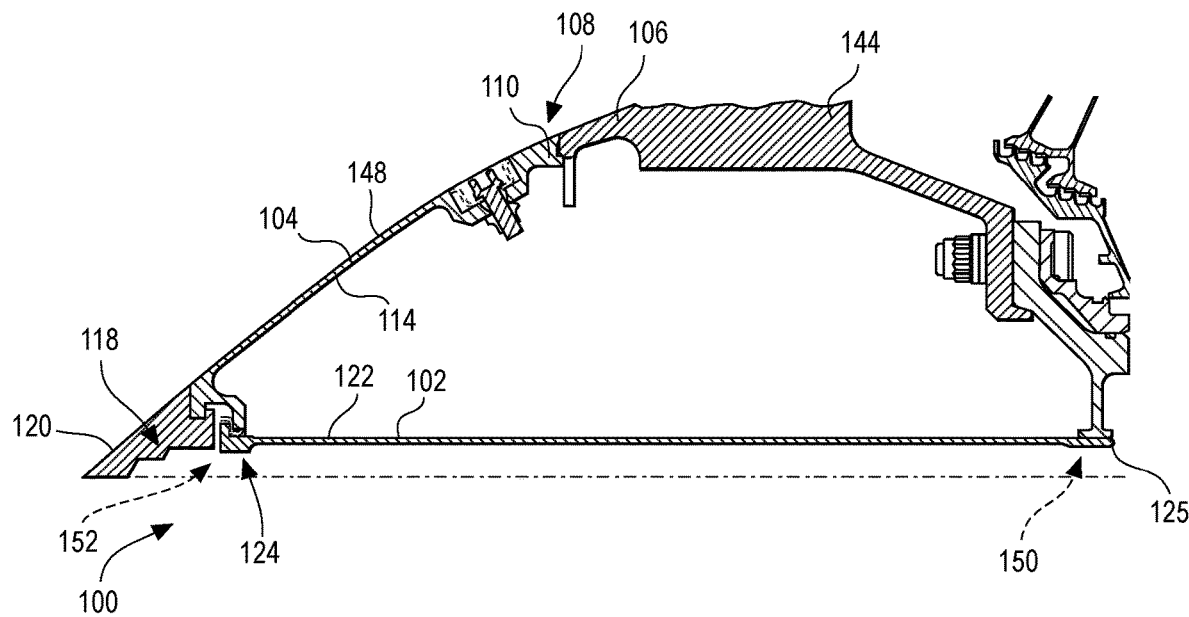
FIG. 5 shows a cross-sectional view of a portion of a nose cone attachment.

Referring now to FIG. 5, a center bolt nose cone assembly 100 is depicted. In this embodiment of the nose cone assembly 100, base end fasteners 70 (FIG. 3) for securing the nose cone mount ring 62 to a hub flange 72 in the conventional nose cone assembly 56 are removed. Instead, the nose cone assembly 100 includes a single center connector 102. The single center connector 102 may be a metallic or composite tube, sleeve, threaded bolt, axial clamp, or another suitable connector. In the example embodiment shown and described, the single center connector 102 is a tube 122 with a flange/bolt head 124 on one end and threads 125 on the other. The tube 122 clamps or ties the nose cone 104 through the center thereof to a blisk hub 106 or conventional rotor disk 40 through axial compression at an outer diameter 107 of a base end 108 of the nose cone 104. Thus, the nose cone 104 is coupled to the blisk 106 by the single center bolt connector 102.

Figure 6:
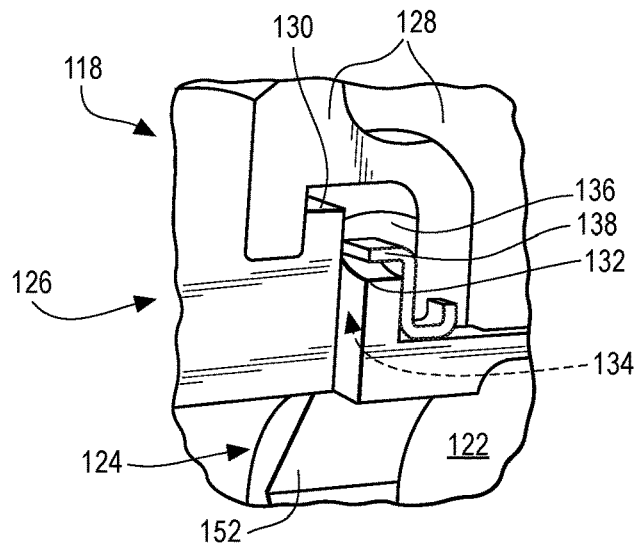
FIG. 6 shows a cross-sectional view of a forward portion of a nose cone attachment.

The single center connector 102 is anchored to a forward end 118 of the nose cone 104 directly behind a tip 120 thereof. Referring to FIG. 6, the tube 122 has disposed near the forward end 118 the bolt head 124. The bolt head 124 is fixedly coupled to the forward end 118 of the nose cone 104 by a threaded locking feature 126 as illustrated in FIG. 6. The threaded locking feature 126 has a generally U-shaped flange 128 that partially surrounds the bolt head 124 and a complementary flange 130 on a back surface of the forward end 118 of the nose cone tip 120. The thread locking feature 126 further includes a cup lock washer 132 formed about the bolt head 124. The bolt head 124 has a plurality of scallops 134 disposed on the outer circumference thereof. The scallops 134 align with the generally U-shaped flange 128 such that gaps or cavities 136 are formed between the flange 128 and the outer perimeter of the bolt head 124. A locking piece 138 formed from a piece of sheet metal or another suitably malleable material may be inserted into each gap 136 and then bent in order to deter rotation of the bolt head 124. By way of the cup lock washer 132, the axial clamp/tube 122 is anti-rotated from the forward end 118. Thereby the nose cone 104 is anti-rotated from the forward end 118. The bolt head 124 of FIG. 6 further includes a tooling feature 152 for easily attaching, detaching, and re-attaching the nose cone 104 by way of the axial clamp/tube 122. The other end of the tube 122 that has threads 125 is tied into/threaded into an interior portion of the blisk hub 106. Thus, the tube single center connector 102 is coupled to both the nose cone 104 and the blisk hub 106.

Figure 7:
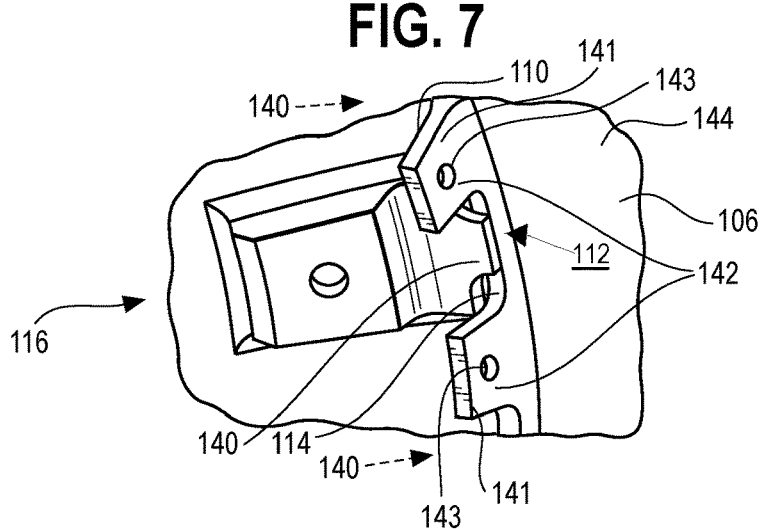
FIG. 7 shows a isometric view of an aft portion of a nose cone attachment.

Referring again to FIG. 5, the base end 108 of the nose cone 104 abuts directly to a forward face 110 of the blisk hub 106. The base end 108 of the nose cone 104 may incorporate a spigot 112 (seen in FIG. 7). Furthermore, the spigot 112 may incorporate an interrupted pilot configuration 116. Referring now to FIG. 7, the spigot 112 of the nose cone 104 interconnects with an interior surface 114, or socket, of the blisk hub 106. The interrupted pilot 116 of the nose cone base 108 interlocks the spigot 112 with the socket 114. The configuration of the interrupted pilot 116 operates to assist in centering, interlocking, and anti-rotation during operation.

The interrupted pilot 116 illustrated in FIG. 7 includes a plurality of tabs 140. The tabs 140 extend out from the base end 108 of the nose cone 104 in a generally horizontal direction therefrom. The added complexity of the tabs 140 are included in the nose cone 104 rather than further complicating the blisk hub 106, which is an already relatively more expensive component. Furthermore, the forward face 110 of the blisk hub 106 includes blisk forward balance features 142 extending therefrom. The blisk forward balance mechanism 142 in this embodiment are scallops 141 that may have holes, blind bores, or added individual balance weights 143 particularly spaced thereon for precise forward balancing. This is a significant feature of a blisk 144 because the blisk 144 is not balanced by the modification of pairs of fan blades 36. Instead, forward balancing is accomplished by the individual balance weights 143 disposed on the scallops 141. Therefore, blisk balancing in the forward balance plane is retained as a feature of the blisk hub 106. The blisk forward balance features 142 extend inward toward the shaft 38 from an inner diameter of the blisk hub 106. Therefore, while the blisk hub 106 maintains the forward balance features 142 thereof, the forging envelope is not extended such as by axially extending integral fingers 80. This simplifies manufacturing thereby saving time and expense. Likewise, because the integral fingers 80 are difficult to machine, requiring tight tolerances in addition to the extended forging envelope mentioned hereinabove, the removal thereof saves further time and expense by decreasing mill and mechanized edge profiling (MEP) time. The tabs 140 of the interrupted pilot 116 interconnect with the scallops 141 of the blisk hub 106 according to interlocking/interconnecting discussed hereinabove.

Referring still to FIG. 7, the tabs 140 extend from the nose cone 104 generally transverse to the scalloped blisk forward balance features 142 extending from the forward face 110 of the blisk hub 106. The tabs 140 interfit between the blisk forward balance features 142 (scallops 141 in the example embodiment shown here) thereby interlocking the nose cone 104 with the blisk hub 106. The base end 108 of the nose cone 104 is anti-rotated by the interlocking interrupted pilot configuration 116 thereof. Thus, the nose cone 104 is anti-rotated from the base end 108. Moreover, the nose cone 104 is anti-rotated from both the base end 108, by the interlocking interrupted pilot configuration 116, and the forward end 118 by the threaded locking feature 126 and cup lock washer 132 with respect to the axial clamp/tube 122.

Figure 8:
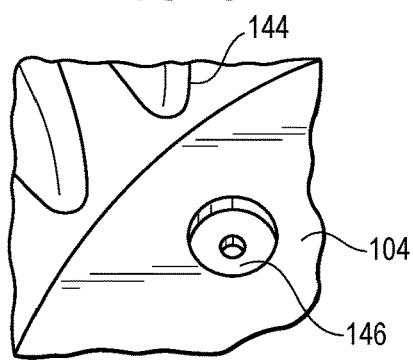
FIG. 8 shows a partial isometric view of a nose cone trim balance feature.

FIG. 8 depicts a nose cone trim balance feature 146. The example embodiment of the nose cone trim balance mechanism 146 depicted is plurality of holes, fasteners, and balance weights used to add a precise amount of mass to a location along the outer surface of the nose cone 104. The nose cone trim balance feature(s) 146 disposed on the nose cone 104 may be significantly tailored and optimized because they are not restricted by the location of the integral fingers 80 or the securing component(s) 76 like the conventional nose cone assembly 56. The quantity and size of the trim balance features 146 are not limited by the circumferential spacing of the blisk hub 106 or the rotor disk 42. Therefore, the trim balance mechanism 146 may increase the accuracy, precision, and customization of provided trim balance capability as compared with the baseline acceptable trim balancing of the conventional nose cone assembly 56. Likewise, eliminating the interdependency of the trim balance features 146 from the forward balance features 142 may improve the overall balancing capability and customizability of the turbofan engine 30.

The design of the center bolt nose cone assembly 100 also enables the trim balance mechanism 146 to be configured such that the weights thereof are parallel to the incoming airflow and not transverse thereto. In many conventional nose cone attachment configurations 56, the fasteners 70 are arranged parallel to a centerline axis of the turbofan engine 30. This arrangement disposes the fasteners 70 in a more typical bolted flange arrangement, however such an arrangement creates forward facing pockets in the nose cone assembly 56 wherein the fasteners 70 are located. Such pockets are aerodynamically unfavorable and may be detrimental to the fan efficiency because of the air flow disruption caused thereby. The nose cone assembly 100 of FIG. 5 enables the fasteners/weights forming the trim balance features 146 to be rotated parallel to the incoming air flow thereby decreasing the aerodynamic loss associated with the axial pockets of the conventional design.

Finally, any axisymmetric features that might simplify the integral fingers or create additional areas for balance may produce obstacles for high cycle fatigue fan blades at the leading edge of the blisk hub 52. Axisymmetric features, such as the securing component(s) 76 at the forward face 110 of the blisk hub 52, may increase stiffness of the blisk 48 attaching to a conventional nose cone assembly 56 and may further raise dynamic stress in a blade leading edge thereof. The stiffness may be corrected for by breaking/interrupting the conventional mount ring 62 beneath (within) a forward rim of the leading edge in order to adapt the conventional fan blisk 48 to the high cycle fatigue (HCF) operating conditions. However, the stiffness resulting from the securing component(s) 76 and the integral fingers 80 may be removed by replacing said parts with the single center connector 102 of the presently described center bolt nose cone assembly 100.

Referring again to FIG. 5, the embodiment depicted further allows for a smooth flow path over the nose cone 104 as the securing components are interior to the nose cone 104. Some conventional designs employ an axially oriented fastening method but such a method creates local forward facing cavities in a conical nose cone surface proximal each fastener thereby increasing loss, decreasing efficiency, and reducing aerodynamic performance. In addition, the embodiment of FIG. 5 decreases the aerodynamic gap between the base end 108 of the nose cone 104 and the blisk hub 106 or rotor disk 40. Moreover, because the center bolt nose cone assembly 100 ties the nose cone 104 to the blisk hub 106 or rotor disk 40 with the single center bolt connector 102, the two components are secured through axial compression. The axial compression further decreases any aerodynamic gaps between the nose cone 104 and the blisk hub 106 or rotor disk 40 by physically pushing the two components together.

The nose cone 104 is preferably fabricated from aluminum, although other suitable materials may be used. An aluminum nose cone may be more easily contoured as compared with composite in order to optimally decrease the weight thereof. In an embodiment with the nose cone 104 fabricated from aluminum, the overall weight of this portion of the turbofan engine 30 may be reduced, in part resulting from removal of the integral fingers 80 and/or mount ring 62. However, in an embodiment with the nose cone 104 fabricated from composite material, even further improvements in weight reduction may be realized.

While the above embodiments contemplate an axial bolt or clamp, the single center connector 102 may be incorporated into an already present mechanical low-pressure turbine overspeed system (LPTOSS). An LPTOSS prevents the axial compressor from exceeding the maximum rotational speed of which the turbofan 34 or blisk 144 is structurally capable. While the axial compressor may reach very high rotational speeds, the turbofan 34 or blisk 144 may not be able to match such speeds without compromising structural integrity and risking catastrophic mechanical failure. An LPTOSS configures a reference shaft that abuts the inner diameter of the blisk hub 106 and is in mechanical communication with one or more stages of the compressor such that if the turbofan 34 or blisk 144 is in danger of an overspeed event, fuel injection may be cut-off in anticipation of flameout within the compressor. In an embodiment of the center bolt nose cone assembly 100, the axial clamp/tube 122 is threaded into/through the reference shaft of modified LPTOSS. This embodiment may further increase weight reduction by tying the axial clamp 122 to an existing component.

The embodiment(s) detailed above may be combined in full or in part, with any alternative embodiment(s) described.

INDUSTRIAL APPLICABILITY

In summary, the present disclosure contemplates a nose cone attachment to a fan blisk or rotor disc with a small front circumference that overcomes difficulties in packaging. Furthermore, the nose cone attachment incorporates blisk/disc balance features and reduces cost and weight of the nose cone attachment as well as the overall turbofan stage of an engine. The difficulties addressed by the above-described center bolt nose cone assembly are typical for civilian small/medium engine fan sizes. The center bolt nose cone assembly may increase cost and weight saves yet further when applied to fan blisk designs with a low hub/tip ratio, such as, for example, less than 0.3. An objective of the recent shift in the art toward blisks with integral nose cone attachment fingers/tangs, and away from traditional mount rings, is to reduce cost and weight. However, the current integral finger designs constrain incorporation of blisk forward balance features. For circumferentially restricted designs, this may lead to a lack of design space.

Fitting a sufficient number of suitably sized fingers for nose cone attachment and trim balance represents a challenge given the number of balance features competing for valuable space at the front of the blisk. The center bolt nose cone attachment described hereinabove removes interdependency of forward and trim balance features by attaching the nose cone with an axial clamp. Further design simplification for manufacturing and removal of aerodynamic gaps with the center bolt nose cone attachment may further decrease cost and increase aerodynamic advantages realized by the above-described axially clamped nose cone assembly. Further optimization of the forward and trim balance features as well as application-specific size and manufacturing details may be customized all while adhering to the general principles of the design disclosed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An assembly for attaching a nose cone to a turbofan engine, comprising:
    a single center bolt connector having a first threaded end and a second end opposite the first end wherein the second end includes an integral first flange having an aft surface;
    a nose cone having a second flange having a forward surface in interfering relationship with and facing the aft surface of the first flange and further having a nose cone tip spaced from the single center bolt connector; and
    a turbofan hub;

wherein the single center bolt connector couples the nose cone to the turbofan hub; and
wherein the single center bolt connector axially clamps the nose cone to the turbofan hub.

2. The assembly of claim 1, further comprising:
a nose cone base; and
a hub forward face;
wherein the nose cone base abuts the hub forward face; and
wherein the single center bolt connector provides axial compression to hold the nose cone base against the hub forward face.

3. The assembly of claim 2, wherein the abutment of the nose cone base against the hub forward face provides an aerodynamic surface, and wherein the axial compression of the nose cone base against the hub forward face closes one or more aerodynamic gaps between the nose cone and the hub.

4. The assembly of claim 2, further comprising:
an interrupted pilot; and
one or more scallops;
wherein the interrupted pilot is disposed about the nose cone base;
wherein the one or more scallops are disposed about the hub forward face; and
wherein the interrupted pilot couples the nose cone base to the hub forward face by interconnecting with the one or more scallops.

5. The assembly of claim 4, further comprising:
one or more trim balance features disposed about the nose cone, wherein the one or more trim balance features are separated from the interrupted pilot.

6. The assembly of claim 5, further comprising:
one or more forward balance features disposed about the hub forward face, wherein the one or more forward balance features are the one or more scallops; and
wherein the one or more trim balance features and the one or more forward balance features are separately customizable.

7. The assembly of claim 4, further comprising:
a cup lock washer, wherein a first end of the single center bolt connector is coupled with the nose cone by the cup lock washer;
wherein a threaded end of the single center bolt connector is coupled with the turbofan hub; and
wherein the single center bolt connector forms an axial clamp between the first end and the threaded end.

8. The assembly of claim 7, wherein the cup lock washer anti-rotates the single center bolt connector, and wherein the one or more scallops anti-rotates the interrupted pilot disposed about the nose cone base.

9. A method of attaching a nose cone to a turbofan engine, comprising:
coupling a first end of a single center connector to the nose cone including placing an aft surface of a center connector flange integral with the single center connector in interfering relationship with and facing a forward surface of a nose cone flange;
coupling a second end of the center connector to a blisk;
axially clamping the nose cone to the blisk with the center connector; and
mounting a nose cone tip to the nose cone at a position spaced from the single bolt connector.

10. The method of claim 9, further comprising:
coupling a circular base of the nose cone to a forward face of a blisk hub; and
providing an aerodynamic surface from the nose cone and the blisk hub by axially compressing the circular base of the nose cone against the forward face of the blisk hub such that one or more aerodynamic gaps therebetween are closed.

11. The method of claim 10, further comprising:
providing an interrupted pilot about the circular base;
providing one or more scallops about the forward face; and
interlocking the circular base of the nose cone to the forward face of the blisk hub by antirotating the interrupted pilot with the one or more scallops.

12. The method of claim 11, further comprising:
trim balancing the nose cone;
forward balancing the blisk; and
separating mechanisms by which trim balancing and forward balancing are customized.

13. The method of claim 11, further comprising:
providing a trim balancing mechanism and a forward balancing mechanism; and
separating the trim balancing mechanism and the forward balancing mechanism such that the trim balancing mechanism and the forward balancing mechanism are not interdependent.

14. The method of claim 11, further comprising:
providing trim balancing at a first location on the nose cone;
providing forward balancing at a second location on the blisk hub; and
eliminating interdependency between the trim balancing and the forward balancing by disposing the trim balancing and the forward balancing at first and second locations, respectively.

15. The method of claim 11, further comprising:
coupling the first end of the center connector to the nose cone with a thread locking cup lock washer;
coupling the second end of the center connector to the blisk with threading provided on the second end; and
creating axial compression through the couplings of the first and the second ends of the center connector.

16. The method of claim 15, further comprising:
anti-rotating the center connector with the thread locking cup lock washer; and
anti-rotating the nose cone with the interlocking interrupted pilot of the circular base of the nose cone.

* * * * *